United States Patent [19]
Ando et al.

[11] Patent Number: 5,661,194
[45] Date of Patent: Aug. 26, 1997

[54] WATER-ABSORPTIVE SOFT CONTACT LENS

[75] Inventors: Ichiro Ando; Toru Kawaguchi, both of Kasugai; Yasushi Yamamoto; Yasuo Tarumi, both of Gunma-ken, all of Japan

[73] Assignees: Menicon Co., Ltd., Nagoya; Shin-Etsu Chemical Co., Ltd., Tokyo, both of Japan

[21] Appl. No.: 580,888

[22] Filed: Dec. 29, 1995

[30] Foreign Application Priority Data

Jan. 10, 1995 [JP] Japan ................................. 7-002107

[51] Int. Cl.⁶ ............................................. C08F 230/08
[52] U.S. Cl. ........................... 523/107; 523/106; 526/242; 526/279; 526/323.2; 351/160 H
[58] Field of Search ................................ 523/107, 106; 351/160 H; 526/323.2, 242, 279

[56] References Cited

U.S. PATENT DOCUMENTS

| | | | |
|---|---|---|---|
| 4,868,260 | 9/1989 | Kawaguchi | 526/242 |
| 5,023,305 | 6/1991 | Onozuka et al. | 526/245 |
| 5,250,583 | 10/1993 | Kawaguchi et al. | 523/107 |
| 5,374,662 | 12/1994 | Lai et al. | 524/547 |
| 5,539,016 | 7/1996 | Kunzler et al. | 523/107 |

*Primary Examiner*—Andrew E. C. Merriam
*Attorney, Agent, or Firm*—Armstrong, Westerman, Hattori, McLeland & Naughton

[57] ABSTRACT

A water-absorptive soft contact lens comprising a polymer prepared by polymerizing a monomer mixture comprising, as main components, (A) 25 to 75% by weight of a (meth) acrylamide monomer, (B) 20 to 70% by weight of a fluoroalkyl (silicon-containing alkyl) fumarate, and (C) 0.01 to 10% by weight of a crosslinkable monomer. The water-absorptive soft contact lens has excellent oxygen permeability and high mechanical strength independent of water content, and is excellent in transparency and shape stability.

6 Claims, 1 Drawing Sheet

WATER-ABSORPTIVE SOFT CONTACT LENS

BACKGROUND OF THE INVENTION

The present invention relates to a water-absorptive soft contact lens, and more particularly to a water-absorptive soft contact lens which has excellent oxygen permeability and high mechanical strength independent of water content, and furthermore, which is excellent in transparency and shape stability.

Usually, in contact lens materials, there are hard materials and soft materials. In order to obtain a contact lens which is excellent in sensation of wearing, in general, soft materials are suitably used. In the soft materials, there are water-absorptive materials which swell and soften when absorbing water and substantially non-water-absorptive materials.

In order to be able to wear a contact lens in an eye more safely for a long period of time, it is necessary that more oxygen is supplied for a cornea. Therefore, there is employed a method for substantially heightening oxygen permeability comprising heightening oxygen permeability of materials or reducing the thickness of a lens.

The above-mentioned water-absorptive material itself does not permeate oxygen, and the oxygen permeability is imparted to the material through the water absorbed in the material. For instance, as is clear from the description of "OXYGEN PERMEABILITY OF CONTACT LENS MATERIALS: A 1993 UPDATE" by Fatt and Ruben, which is described in "Journal of the British Contact Lens Association", 17 [1](1994), pages 11 to 18 (hereinafter referred to as "Journal of Fatt et al"), in general, it is known that oxygen permeability depends on water content (see a graph denoted with the mark B in FIG. 1). Accordingly, in order to heighten the oxygen permeability of a contact lens, a material having a high water content is necessitated. However, in general, there arises a disadvantage such that the mechanical strength of the material becomes lower in accordance with the increase of water content of the material.

When a low water-absorptive material is used, there has been attempted the diminishing of the thickness of a lens made of the material to substantially heighten its oxygen permeability. However, the production of a thin lens which can supply sufficient oxygen for a cornea is technically difficult. Also, since thinner the lens is, the lower the shape stability of the lens becomes, there arises a problem when wearing a thin lens in an eye such that handling of the lens becomes difficult during wearing in an eye.

The present invention has been accomplished in consideration of the above prior art.

An object of the present invention is to provide a water-absorptive soft contact lens which has excellent oxygen permeability and high mechanical strength independent of water content.

Another object of the present invention is to provide a water-absorptive soft contact lens which is excellent in transparency, flexibility and shape stability.

These and other objects of the present invention will become apparent from the description hereinafter.

SUMMARY OF THE INVENTION

In accordance with the present invention, there is provided a water-absorptive soft contact lens comprising a polymer prepared by polymerizing a monomer mixture comprising, as main components, (A) 25 to 75% by weight of a (meth)acrylamide monomer, (B) 20 to 70% by weight of a fluoroalkyl (silicon-containing alkyl) fumarate, and (C) 0.01 to 10% by weight of a crosslinkable monomer.

DETAILED DESCRIPTION

Figure 1:
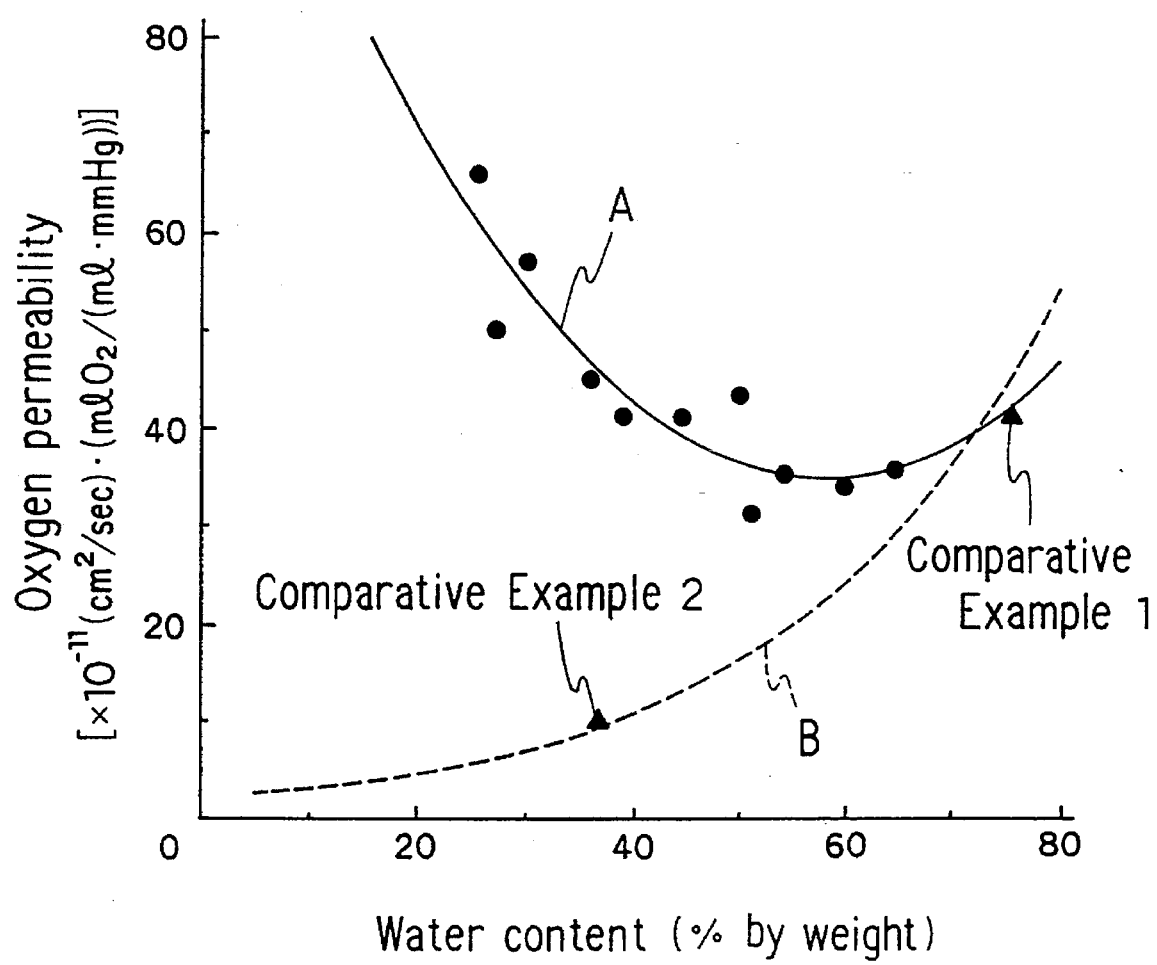
FIG. 1 is a graph showing the relation between the water content and the oxygen permeability of the polymers obtained in Examples 1 to 11. Comparative Examples 1 and 2 and a conventional soft contact lens material whose oxygen permeability is dependent on its water content (hereinafter referred to as "water-content-depending-type soft contact lens material").

The water-absorptive soft contact lens of the present invention comprises, as mentioned above, a polymer prepared by polymerizing a monomer mixture comprising, as main components, (A) 25 to 75% by weight of a (meth)acrylamide monomer (hereinafter referred to as ±(meth)acrylamide monomer I5 (A)"), (B) 20 to ? 0% by weight of a fluoroalkyl (silicon-containing alkyl) fumarate (hereinafter referred to as fluoroalkyl (silicon-containing alkyl) fumarate (B)"), and (C) 0.01 to 10% by weight of a crosslinkable monomer (hereinafter referred to as "crosslinkable monomer (C)").

The (meth)acrylamide monomer (A) is a component for imparting a desired water content and flexibility to an obtained water-absorptive soft contact lens when water is absorbed therein.

As typical examples of the (meth)acrylamide monomer (A), there can be cited, for instance, acrylamide, methacrylamide; N-alkyl(meth)acrylamides such as N-methylacrylamide, N-methylmethacrylamide, N-ethylacrylamide, N-ethylmethacrylamide, N-n-propylacrylamide, N-n-propylmethacrylamide, N-isopropylacrylamide and N-isopropylmethacrylamide; N,N-dialkyl(meth)acrylamides such as N,N-dimethylacrylamide, N,N-diethylmethacrylamide, N,N-diethylacrylamide, N,N-diethylmethacrylamide, N,N-methyl(ethyl)acrylamide, N,N-methyl(ethyl)methacrylamide, N,N-methyl(propyl)acrylamide and N,N-methyl(propyl)methacrylamide; and the like, and these can be used alone or in an admixture thereof.

Among the (meth)acrylamide monomer (A), from the viewpoint that water-absorptive property which imparts sufficient flexibility to an obtained water-absorptive soft contact lens even when its amount is a little and that its handling is easy, N,N-dimethylacrylamide and N,N-dimethylmethacrylamide are preferable.

The amount of the (meth)acrylamide monomer (A) is adjusted to at least 25% by weight, preferably at least 30% by weight of the monomer mixture in order to avoid that the water content of an obtained water-absorptive soft contact lens becomes insufficient and that flexibility of the contact lens is lowered. Also, the amount of the (meth)acrylamide monomer (A) is adjusted to at most 75% by weight, preferably at most 70% by weight of the monomer mixture in order to avoid that mechanical strength and shape stability of the water-absorptive soft contact lens are lowered.

The above-mentioned fluoroalkyl (silicon-containing alkyl) fumarate (B) is a component for improving mechanical strength and shape stability together with oxygen permeability of an obtained water-absorptive soft contact lens.

As typical examples of the fluoroalkyl (silicon-containing alkyl) fumarate (B), there can be cited, for instance, a compound represented by the general formula (I):

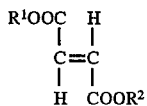

wherein $R^1$ is a fluoroalkyl group represented by the general formula (II):

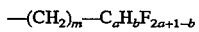

$$-(CH_2)_m-C_aH_bF_{2a+1-b} \quad (II)$$

in which a is an integer of 1 to 21, b is 0 or 1 and m is 0, 1 or 2, and $R^2$ is a group represented by the general formula (III):

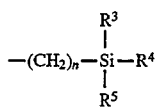

in which each of $R^3$, $R^4$ and $R^5$ is independently an alkyl group having 1 to 3 carbon atoms or trimethylsiloxy group and n is an integer of 1 to 3, and the like.

As concrete examples of the compound represented by the general formula (I), there can be cited, for instance, 2,2,2-trifluoroethyl(trimethylsilylpropyl) fumarate, 1,1,1,3,3,3-hexafluoro-2-propyl (trimethylsilylpropyl)fumarate, 2,2,3,3,4,4,5,5-octafluoropentyl(trimethylsilylpropyl)fumarate, 2,2,2-trifluoroethyl(pentamethyldisiloxanylpropyl)fumarate, 1,1,1,3,3,3-hexafluoro-2-propyl (pentamethyldisiloxanylpropyl)fumarate, 2,2,3,3,4,4,5,5-octafluoropentyl (pentamethyldisiloxanylpropyl)fumarate, 2,2,2-trifluoroethyl(tetramethyl(trimethylsiloxy)disiloxanylpropyl)fumarate, 1,1,1,3,3,3-hexafluoro-2-propyl(tetramethyl(trimethylsiloxy)disiloxanylpropyl) fumarate, 2,2,3,3,4,4,5,5-octafluoropentyl(tetramethyl (trimethylsiloxy)disiloxanylpropyl)fumarate, 2,2,2-trifluoroethyl(tris(trimethylsiloxy)silylpropyl)fumarate, 1,1,1,3,3,3-hexafluoro-2-propyl(tris(trimethylsiloxy) silylpropyl)fumarate, 2,2,3,3,4,4,5,5-octafluoropentyl (tris(trimethylsiloxy)silylpropyl)fumarate, and the like, and these can be used alone or in an admixture thereof.

The amount of the fluoroalkyl (silicon-containing alkyl) fumarate (B) is adjusted to at least 20% by weight, preferably at least 25% by weight of the monomer mixture in order to sufficiently increase oxygen permeability, mechanical strength and shape stability of an obtained water-absorptive soft contact lens. Also, the amount of the fluoroalkyl (silicon-containing alkyl) fumarate (B) is adjusted to at most 70% by weight, preferably at most 65% by weight of the monomer mixture in order to avoid that the amount of the above-mentioned (meth) acrylamide monomer (A) becomes relatively small, thereby flexibility of the water-absorptive soft contact lens is lowered with the lowering of the water content.

The fluoroalkyl (silicon-containing alkyl) fumarate (B) is not substantially homopolymerized but well copolymerized with the (meth)acrylamide monomer (A). Accordingly, in order to complete the copolymerization of the (meth) acrylamide monomer (A) with the fluoroalkyl (silicon-containing alkyl) fumarate (B), it is necessitated that the number of moles of the used fluoroalkyl (silicon-containing alkyl) fumarate (B) is smaller than the number of moles of the used (meth)acrylamide monomer (A). Therefore, the amount of the fluoroalkyl (silicon-containing alkyl) fumarate (B) is adjusted to be within the above-mentioned range.

The above-mentioned crosslinkable monomer (C) is a component for improving hardness, shape stability, and furthermore, optical property such as transparency of an obtained water-absorptive soft contact lens.

As typical examples of the crosslinkable monomer (C), there can be cited, for instance, (meth)acrylic acid esters having at least one of an aromatic allyl group and an aromatic vinyl group, such as 4-vinylbenzyl acrylate, 4-vinylbenzyl methacrylate, 4-allylbenzyl acrylate and 4-allyl benzyl methacrylate; allyl acrylate, allyl methacrylate, trimethylolpropane triacrylate, trimethylolpropane trimethacrylate, ethylene glycol diacrylate, ethylene glycol dimethacrylate, divinylbenzene; a crosslinkable fumarate represented by the general formula (IV):

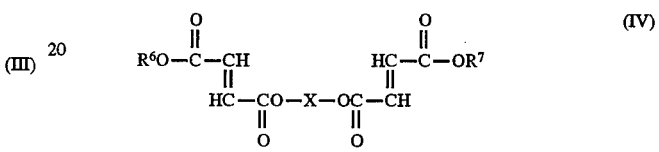

wherein each of $R^6$ and $R^7$ is independently an alkyl group, a fluoroalkyl group represented by the general formula (II):

$$-(CH_2)_m-C_aH_bF_{2a+1-b} \quad (II)$$

in which a is an integer of 1 to 21, b is 0 or 1 and m is 0, 1 or 2 or a group represented by the general formula (III):

in which each of $R^3$, $R^4$ and $R^5$ is independently an alkyl group having 1 to 3 carbon atoms or trimethylsiloxy group, and n is an integer of 1 to 3; and X is ethylene group or a group represented by the general formula (V):

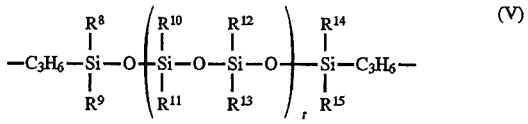

in which each of $R^8$, $R^9$, $R_{10}$, $R_{11}$, $R_{12}$, $R_{13}$, $R_{14}$ and $R^{15}$ is independently methyl group, phenyl group or trimethylsiloxy group, and t is 0 or an integer of 1 to 55; and the like, and these can be used alone or in an admixture thereof. Hereupon, as mentioned above, the fluoroalkyl (silicon-containing alkyl) fumarate (B)is poor in homopolymerizability. Therefore, a crosslinkable monomer (C) having a polymerizable group showing high copolymerizability with the fluoroalkyl (silicon-containing alkyl) fumarate (B), such as styryl group is suitably used. From the above-mentioned reason, among the above-mentioned crosslinkable monomer (C), the (meth)acrylic acid ester having at least one of an aromatic allyl group and an aromatic vinyl group is suitably used, and especially, 4-vinylbenzyl acrylate and 4-vinylbenzyl methacrylate are particularly suitably used.

The amount of the crosslinkable monomer (C) is adjusted to at least 0.01% by weight, preferably at least 0.05% by weight of the monomer mixture in order to sufficiently accelerate the crosslinking and sufficiently improve hardness and shape stability of an obtained water-absorptive soft contact lens. Also, the amount of the crosslinkable monomer (C) is adjusted to at most 10% by weight, preferably at most 5% by weight of the monomer mixture in order to avoid that the crosslinking density becomes too high, thereby the water-absorptive soft contact lens becomes brittle.

The monomer mixture which is used for preparing the water-absorptive soft contact lens of the present invention contains, as main components, the (meth)acrylamide monomer (A), the fluoroalkyl (silicon-containing alkyl) fumarate (B) and the crosslinkable monomer (C). In the present invention, in addition to these components, there can be admixed optional components which have excellent copolymerizability with the fluoroalkyl (silicon-containing alkyl) fumarate (B), such as vinyl esters represented by vinyl acetate, N-vinyllactams represented by N-vinyl-2-pyrrolidone and furthermore, styrenes, with the above-mentioned monomer mixture in order to adjust water content, hardness, flexibility and the like of an obtained water-absorptive soft contact lens. These optional components can be used within the range of the amount which would not inhibit the essential properties of the water-absorptive soft contact lens of the present invention. It is desired that the amount of the optional components is adjusted to at most 10% by weight, preferably at most 5% by weight of the above-mentioned monomer mixture.

In the present invention, in order to impart ultraviolet-ray absorptive property to the water-absorptive soft contact lens and color the water-absorptive soft contact lens, a polymerizable ultraviolet-ray absorbing agent, polymerizable dyestuff, polymerizable ultraviolet-ray absorbing dyestuff and the like can be used as one component of the monomer mixture.

As typical examples of the above-mentioned polymerizable ultraviolet-ray absorbing agent, there can be cited, for instance, benzophenone polymerizable ultraviolet-ray absorbing agents such as 2-hydroxy-4-acryloyloxybenzophenone and 2-hydroxy-4-methacryloyloxybenzophenone; benzotriazole polymerizable ultraviolet-ray absorbing agents such as 2-(2'-hydroxy-5'-acryloyloxyethoxy-3'-t-butylphenyl)-5-methyl-2H-benzotriazole and 2-(2'-hydroxy-5'-methacryloyloxyethoxy-3'-t-butylphenyl)-5-methyl-2H-benzotriazole; and the like, and these can be used alone or in an admixture thereof.

As typical examples of the above-mentioned polymerizable dyestuff, there can be cited, for instance, azo polymerizable dyestuff such as 1-phenylazo-4-acryloyloxynaphthalene, 1-phenylazo-4-methacryloyloxynaphthalene, 1-phenylazo-2-hydroxy-3-acryloyloxynaphthalene, 1-phenylazo-2-hydroxy-3-methacryloyloxynaphthalene, 1-naphthylazo-2-hydroxy-3-acryloyloxynaphthalene, 1-naphthylazo-2-hydroxy-3-methacryloyloxynaphthalene, 1-(α-anthrylazo)-2-hydroxy-3-acryloyloxynaphthalene, 1-(α-anthrylazo)-2-hydroxy-3-methacryloyloxynaphthalene, 1-((4'-(phenylazo)phenyl)azo)-2-hydroxy-3-acryloyloxynaphthalene and 1-((4,-phenylazo)phenyl)azo)-2-hydroxy-3-methacryloyloxynaphthalene; anthraquinone polymerizable dyestuff such as 1,5-bis(acryloylamino)-9,10-anthraquinone, 1,5-bis (methacryloylamino)-9,10-anthraquinone, 1-(4'-vinylbenzoylamido)-9,10-anthraquinone and 4-amino-1-(4'-vinylbenzoylamido)-9,10-anthraquinone; nitro polymerizable dyestuff such as o-nitroanilinomethyl acrylate and o-nitroanilinomethyl methacrylate; phthalocyanine polymerizable dyestuff such as acryloyl-modified tetraamino copper phthalocyanine, methacryloyl-modified tetraamino copper phthalocyanine, acryloyl-modified (dodecanoyl-modified tetraamino copper phthalocyanine) and methacryloyl-modified (dodecanoyl-modified tetraamino copper phthalocyanine; and the like, and these can be used alone or in an admixture thereof.

As typical examples of the above-mentioned polymerizable ultraviolet-ray absorbing dyestuff, there can be cited, for instance, benzophenone polymerizable ultraviolet-ray absorbing dyestuff such as 2,4-dihydroxy-3-(p-styrenoazo) benzophenone, 2,4-dihydroxy-5-(p-styrenoazo) benzophenone, 2,4-dihydroxy-3-(p-acryloyloxymethylphenylazo)benzophenone, 2,4-dihydroxy-3-(p-methacryloyloxymethylphenylazo) benzophenone, 2,4-dihydroxy-5-(p-acryloyloxymethylphenylazo)benzophenone and 2,4-dihydroxy-5-(p-methacryloyloxymethylphenylazo) benzophenone; benzoic acid polymerizable ultraviolet-ray absorbing dyestuff such as 2-hydroxy-4-(p-styrenoazo) phenyl benzoate; and the like, and these can be used alone or in an admixture thereof.

In order to avoid the possibility that physical properties such as mechanical strength of the water-absorptive soft contact lens are lowered, it is desired that the amount of the above-mentioned polymerizable ultraviolet-ray absorbing agent, the polymerizable dyestuff and the polymerizable ultraviolet-ray absorbing dyestuff is adjusted to at most by weight, preferably at most 3% by weight of the monomer mixture.

The water-absorptive soft contact lens of the present invention can be obtained, for instance, by polymerizing the monomer mixture comprising the (meth)acrylamide monomer (A), the fluoroalkyl (silicon-containing alkyl) fumarate (B) and the crosslinkable monomer (C) in a desired amount, respectively, as occasion demands, which may contain the above-mentioned optional the components, polymerizable ultraviolet-ray absorbing agent, the polymerizable dyestuff, the polymerizable ultraviolet-ray absorbing dyestuff and the like, and forming the resulting polymer.

As the polymerization methods, there can be cited, for instance, a method comprising adding a radical polymerization initiator to the monomer mixture, polymerizing the monomer mixture by heating, for instance, at 30° to 60° C. or so for several hours to several tens of hours and completing the polymerization by successively increasing the temperature to 120° to 140° C. or so for several hours to several tens of hours (hereinafter referred to as "thermal polymerization method"); a method comprising adding a photo polymerization initiator to the monomer mixture and polymerizing the monomer mixture by irradiating a ray such as ultraviolet-ray having a wavelength corresponding to the absorption band of the polymerization initiator, in which the photo polymerization initiator is activated (hereinafter referred to as "photo polymerization method"); a method comprising carrying out the polymerization using the combination of the thermal polymerization method and the photo polymerization method; and the like.

When the above-mentioned thermal polymerization method is employed, heating may be carried out in a constant temperature bath or a constant temperature chamber, and an electromagnetic wave such as microwave may be employed, and also the heating may be carried out stepwise. Also, when the above-mentioned photo polymerization method is employed, a sensitizer may be added to the monomer mixture.

In the present invention, when the polymerization is carried out, there can be employed a usual method such as bulk polymerization method or solution polymerization method.

As typical examples of the radical polymerization initiator, there can be cited, for instance, azobisisobutyronitrile, azobisdimethylvaleronitrile, benzoyl peroxide, t-butyl hydroperoxide, cumene peroxide, and the like.

As typical examples of the photo polymerization initiator, there can be cited, for instance, benzoin photo polymerization initiators such as methyl orthobenzoylbenzoate, methyl benzoylformate, benzoin methyl ether, benzoin ethyl ether, benzoin isopropyl ether, benzoin isobutyl ether and benzoin n-butyl ether; phenone photo polymerization initiators such as 2-hydroxy-2-methyl-1-phenylpropane-1-one, p-isopropyl-α-hydroxyisobutylphenone, p-t-butyltrichloroacetophenone, 2,2-dimethoxy-2-phenylacetophenone, α,α-dichloro-4-phenoxyacetophenone and N,N-tetraethyl-4,4-diaminobenzophenone; 1-hydroxycyclohexyl phenyl ketone; 1-phenyl-1,2-propanedione-2-(o-ethoxycarbonyl)oxime; thioxanthone photo polymerization initiators such as 2-chlorothioxanthone and 2-methylthioxanthone; 2-ethylanthraquinone; benzophenone acrylate; benzophenone; benzil; and the like.

The radical polymerization initiator or the photo polymerization initiator may be used by selecting one or at least two from the above-mentioned exemplified ones. It is desired that the amount of the polymerization initiator is 0.001 to 5 parts by weight or so, preferably 0.01 to 2 parts by weight or so based on 100 parts by weight of the total amount of the monomer mixture.

The water-absorptive soft contact lens of the present invention can be obtained by forming the polymer prepared by carrying out the above polymerization. As the forming method, there can be employed a forming method which has been usually employed by a person skilled in the art. For instance, there can be used a suitable method selected from a processing method comprising cutting, polishing and the like (hereinafter referred to as "mechanical processing method"), a molding method using a mold (hereinafter referred to as "molding method"), a method using the combination of the mechanical processing method and the molding method, and the like.

The mechanical processing method is a method comprising polymerizing the monomer mixture in a suitable mold or a suitable container to give a polymer having a shape such as bar, block or plate, subjecting the polymer to a mechanical process such as a cutting process or a polishing process to give a contact lens having a desired shape.

The molding method is a method comprising polymerizing the monomer mixture in a mold having a shape corresponding to a desired shape of a contact lens to give a molded product and, as occasion demands, subjecting the molded product to a finishing process.

The method using the combination of the mechanical processing method and the molding method is a method comprising polymerizing the monomer fixture in a mold having a shape corresponding to at least one side of a desired contact lens shape to give a molded product and subjecting the other side of the molded product to a mechanical process to form a desired shape to give a contact lens.

The formed article produced in accordance with the above-mentioned procedure is then hydrated by immersing the formed article in distilled water, saline, an aqueous solution whose osmotic pressure and pH are adjusted to suitable values, or the like, so that a water-absorptive soft contact lens can be obtained.

The water-absorptive soft contact lens of the present invention has excellent oxygen permeability and high mechanical strength independent of water content. The water content and hardness of the water-absorptive soft contact lens can be arbitrarily adjusted to desired values by adjusting the mixing ratio of the components of the monomer mixture to suitable values. Accordingly, there can be obtained, for instance, a thin water-absorptive soft contact lens having a high oxygen permeability and excellent shape stability, and a central thickness of 0.03 to 0.09 mm or so.

The water-absorptive soft contact lens of the present invention is more specifically described and explained by means of the following Examples. It is to be understood that the present invention is not limited to the Examples, and various changes and modifications may be made in the invention without departing from the spirit and scope thereof.

EXAMPLE 1

As a monomer mixture, a mixture of 70 parts by weight of N,N-dimethylacrylamide, 30 parts by weight of 1,1,1,3,3,3-hexafluoro-2-propyl (tris(trimethylsiloxy)silylpropyl) fumarate and 1.5 parts by weight of ethylene glycol dimethacrylate were used. As a polymerization initiator, azobisisobutyronitrile was added to the monomer mixture in an amount of 0.1 part by weight based on 100 parts by weight of the total amount of the monomer mixture, and they were mixed together. Then, a test tube made of polypropylene having an inside diameter of 20 mm was charged with the obtained mixture, and polymerization was carried out in the test tube at 30° C. for 67 hours, at 80° C. for 1.5 hours and furthermore, at 130° C. for 1 hour to give a hard polymer having a shape like a bar.

To the obtained hard polymer, a cutting and polishing process was conducted to give a test piece having a desired thickness and a diameter of about 13 mm. The test piece was hydrated with distilled water and its physical properties were examined in accordance with the following methods. The results are shown in Table 1.

(A) Water content

Water content (% by weight) of the test piece having a thickness of about 2 mm at 35° C. was determined by the following equation.

Water content (% by weight)=$\{(W-W_o)/W\} \times 100$ wherein W is a weight (g) of the test piece in the hydrated state after the hydration treatment, and Wo is a weight (g) of the test piece in the dried state after dried in a desiccator.

(B) Oxygen permeability ($Dk_{O_2}$)

Using a Seikaken-type film oxygen-gas permeater commercially available from RIKASEIKI KOGYO CO., LTD., oxygen permeability of the test piece was measured in saline at 35° C. The unit of the oxygen permeability is (cm$^2$/sec).(ml O$_2$/(ml.mmHg)), and the oxygen permeability listed on Table 1 means a value when the value of the oxygen permeability of the test piece having a thickness of about 0.2 mm is multiplied by $10^{11}$.

(C) Hardness

After the test piece having a thickness of about 3.5 mm was immersed in distilled water for 2 weeks, hardness of the test piece was measured at 25° C. in accordance with Standard Test Method for Rubber property-Durometer Hardness (Type A) in ASTM D2240.

(D) Needle penetration strengh (i) Needle penetration weight

Using a needle penetration tester, a pressure needle having a diameter of 1/16 inch was put on the center of the test piece and needle penetration weight (g) at breaking of the test piece was measured. The value listed on Table 1 means a value when the thickness of the test piece is converted into about 0.2 mm.

(ii) Elongation ratio

When the above-mentioned item (i) Needle penetration weight was measured, elongation ratio (%) at breaking of the test piece was measured.

(E) Transparency

The test piece subjected to the hydration treatment and the test piece not subjected to the hydration treatment (both of them had a thickness of about 2 mm) were observed with naked eyes, and they were evaluated on the basis of the following criteria for evaluation.

[Criteria for evaluation]

EDMA: ethylene glycol dimethacrylate

VBMA: vinylbenzyl methacrylate

TABLE 1

| | Component of monomer mixture (parts by weight) | | | | | Physical properties of test piece | | | | | | | |
|---|---|---|---|---|---|---|---|---|---|---|---|---|---|
| | (A) | (B) | | (C) | | Water content | Oxygen | Hard- | Needle penetration strength Needle penetration | Elongation | Transparency Before subjected to | After subjected to | |
| Ex. No. | DMAA | F6S4F | F3S4F | EDMA | VBMA | (% by weight) | permeability ($Dk_{0.2}$) | ness (−) | weight (g) | ratio (%) | hydration treatment | hydration treatment | Shape stability |
| 1 | 70 | 30 | — | 1.5 | — | 64 | 36 | 28 | 189 | 49 | A | A | A |
| 2 | 60 | 40 | — | — | 0.5 | 60 | 34 | 25 | 276 | 139 | A | A | A |
| 3 | 60 | 40 | — | — | 1.5 | 51 | 31 | 48 | 347 | 60 | A | A | A |
| 4 | 60 | 40 | — | 1.0 | — | 54 | 35 | 39 | 239 | 100 | A | A | A |
| 5 | 50 | 50 | — | — | 1.0 | 44 | 41 | 35 | 425 | 121 | A | A | A |
| 6 | 50 | 50 | — | — | 2.0 | 39 | 41 | 51 | 449 | 66 | A | A | A |
| 7 | 45 | 55 | — | — | 1.5 | 36 | 45 | 41 | 366 | 86 | A | A | A |
| 8 | 40 | 60 | — | — | 1.5 | 30 | 57 | 40 | 328 | 98 | A | A | A |
| 9 | 40 | 60 | — | — | 2.0 | 27 | 50 | 48 | 456 | 83 | A | A | A |
| 10 | 35 | 65 | — | 0.5 | — | 26 | 66 | 22 | 353 | 308 | A | A | A |
| 11 | 53 | — | 47 | — | 1.0 | 50 | 43 | 44 | 344 | 80 | A | A | A |

A: Colorless and transparent
B: Almost transparent
C: Somewhat clouded (F) Shape stability After hydrating the test piece having a thickness of about 0.06 mm in the shape of a contact lens with distilled water, the test piece was placed on a forefinger so that the convexity of the test piece was touched to the forefinger. After 15 seconds, the dimensions of the test piece were observed with naked eyes and evaluated on the basis of the following criteria for evaluation.

[Criteria for evaluation]

A: The original dimensions of the test piece are maintained.

B: The convexity of the test piece turns to flat or concave, and the test piece adheres to the forefinger.

EXAMPLES 2 to 11

Hard polymers having a shape like a bar were obtained in the same manner as in Example 1 except that the components of the monomer mixture were changed to those shown in Table 1.

Test pieces were produced from the obtained hard polymers in the same manner as in Example 1 and hydrated. The physical properties of the test pieces were examined in the same manner as in Example 1. The results are shown in Table 1.

Each code listed on Table 1 is intended to mean the following monomer.

DMAA: N,N-dimethylacrylamide

F6S4F: 1,1,1,3,3,3-hexafluoro-2-propyl (tris (trimethylsiloxy)silylpropyl) fumarate F3S4F: 2,2,2-trifluoroethyl (tris(trimethylsiloxy) silylpropyl) fumarate Comparative Examples 1 and 2

Using a material having a high water content (N-vinylpyrrolidone-methyl methacrylate copolymer) (Comparative Example 1) or a material having a low water content (2-hydroxyethyl methacrylate-2-hydroxybutyl methacrylate copolymer) (Comparative Example 2) instead of the test piece used in Example 1, water content, oxygen permeability, needle penetration strength, transparency and shape stability were examined in the same manner as in Example 1.

As a result, the material used in Comparative Example 1 had a water content of 75% by weight, an oxygen permeability of $41 \times 10^{-11}$ (cm$^2$/sec).(ml O$_2$/(ml.mmHg)), a needle penetration weight of 72 g and an elongation ratio of 69%, and each evaluation of transparency of both hydrated material and non-hydrated material was A, and the evaluation of shape stability of the material was B.

Also, the material used in Comparative Example 2 had a water content of 37% by weight, an oxygen permeability of $10 \times 10^{-11}$ (cm$^2$/sec).(ml O$_2$/(ml.mmHg)), a needle penetration weight of 120 g and an elongation ratio of 116%, and each evaluation of transparency of both hydrated material and non-hydrated material was A, and the evaluation of shape stability of the material was A.

Furthermore, as to the test pieces obtained in Examples 1 to 11 and the materials used in Comparative Examples 1 and 2, the relation between water content and oxygen permeability at 35° C. was examined. The results are shown in FIG. 1.

In FIG. 1, a graph denoted with the mark A is a graph showing the results of Examples 1 to 11. Also, a graph denoted with the mark B is a graph showing the relation between water content and oxygen permeability of a conventional water-content-depending-type soft contact lens material at 35° C., which is described in Journal of Fatt et al.

The oxygen permeability (Dk) of the conventional water-content-depending type soft contact lens material shown by the graph denoted with the mark B in FIG. 1 is calculated on the basis of the following equation described in Journal of Fatt et al.

$$Dk = 2.0E-11 \exp(0.0411 \times \text{Water content (\% by weight)})$$

From the results shown in Table 1, it can be seen that the polymers obtained in Examples 1 to 11 show excellent transparency before and after the polymers are subjected to the hydration treatment, and are also excellent in shape stability.

Furthermore, from the results shown in Table 1 and FIG. 1, it can be seen that the polymers obtained in Examples 1 to 11 have excellent oxygen permeability and high mechanical strength independent of water content different from a conventional water-content-depending-type soft contact lens material. Also, it can be seen that the water content and hardness of the polymers obtained in Examples 1 to 11 can be arbitrarily adjusted by adjusting the mixing ratio of the components of the monomer mixture, so that a water-absorptive soft contact lens complying with its object can be provided.

To the contrary, the relations between water content and oxygen permeability of the materials used in Comparative Examples 1 and 2 were placed on the graph of a conventional water-content-depending-type soft contact lens material, which is denoted with the mark B in FIG. 1, and it can be seen that when oxygen permeability is increased by heightening water content, mechanical strength is contrarily lowered (Comparative Example 1), and also, when water content is lowerd in order to maintain mechanical strength, oxygen permeability is lowered (Comparative Example 2).

In addition to the ingredients used in the Examples, other ingredients can be used in the Examples as set forth in the specification to obtain substantially the same results.

What is claimed is:

1. A water-absorptive soft contact lens comprising a polymer prepared by polymerizing a monomer mixture comprising, as main components, (A) 25 to 75% by weight of a (meth)acrylamide monomer,
    (B) 20 to 70% by weight of a fluoroalkyl (silicon-containing alkyl) fumarate, and
    (C) 0.01 to 10% by weight of a crosslinkable monomer, wherein the number of moles of said fluoroalkyl (silicon-containing alkyl) fumarate (B) is smaller than the number of moles of said (meth)acrylamide monomer (A).

2. The water-absorptive soft contact lens of claim 1, wherein said (meth)acrylamide monomer is at least one of N,N-dimethylacrylamide and N,N-dimethylmethacrylamide.

3. The water-absorptive soft contact lens of claim 1, wherein said fluoroalkyl (silicon-containing alkyl) fumarate is a compound represented by the general formula (I):

wherein $R^1$ is a fluoroalkyl group represented by the general formula (II):

in which a is an integer of 1 to 21, b is 0 or 1 and m is 0, 1 or 2, and $R^2$ is a group represented by the general formula (III):

in which each of $R^3$, $R^4$ and $R^5$ is independently an alkyl group having 1 to 3 carbon atoms or trimethylsiloxy group, and n is an integer of 1 to 3.

4. The water-absorptive soft contact lens of claim 1, wherein said crosslinkable monomer is a (meth)acrylic acid ester having at least one of an aromatic allyl group and an aromatic vinyl group.

5. The water-absorptive soft contact lens of claim 1, wherein said crosslinkable monomer is at least one of 4-vinylbenzyl acrylate and 4-vinylbenzyl methacrylate.

6. The water-absorptive soft contact lens of claim 1, which has a water content of at least 26% by weight.

* * * * *